United States Patent
Chen et al.

(10) Patent No.: US 9,714,871 B2
(45) Date of Patent: Jul. 25, 2017

(54) REAL-TIME VIRTUAL AXLE ASSEMBLY TEMPERATURE SENSOR

(71) Applicants: Gang Chen, Rochester Hills, MI (US); Roland T Richardson, Detroit, MI (US); Samuel G Brown, Detroit, MI (US); Prashant Hegde, Auburn Hills, MI (US)

(72) Inventors: Gang Chen, Rochester Hills, MI (US); Roland T Richardson, Detroit, MI (US); Samuel G Brown, Detroit, MI (US); Prashant Hegde, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 454 days.

(21) Appl. No.: 14/282,341

(22) Filed: May 20, 2014

(65) Prior Publication Data
US 2015/0338287 A1    Nov. 26, 2015

(51) Int. Cl.
*G01K 5/00* (2006.01)
*G01K 13/00* (2006.01)
*B61K 9/06* (2006.01)
*G01K 13/08* (2006.01)

(52) U.S. Cl.
CPC .............. *G01K 13/00* (2013.01); *B61K 9/06* (2013.01); *G01K 13/08* (2013.01)

(58) Field of Classification Search
USPC ....................................... 374/134, 144, 141
See application file for complete search history.

(56) References Cited

U.S. PATENT DOCUMENTS

| | | | |
|---|---|---|---|
| 5,105,900 A * | 4/1992 | Adler | B60K 23/08 180/247 |
| 6,286,992 B1 | 9/2001 | Kyrtsos | |
| 6,695,472 B1 * | 2/2004 | Nayer | B61K 9/06 250/338.1 |
| 2006/0211530 A1 * | 9/2006 | Weith | F16H 57/0483 475/160 |
| 2012/0193484 A1 * | 8/2012 | Furtwangler | B61K 9/04 246/169 A |
| 2013/0131942 A1 * | 5/2013 | Duraiswamy | F16D 43/284 701/67 |
| 2016/0046185 A1 * | 2/2016 | Morscheck | B60K 17/348 701/65 |
| 2016/0159381 A1 * | 6/2016 | Fahmy | B61L 15/0081 701/19 |

* cited by examiner

*Primary Examiner* — Mirellys Jagan
(74) *Attorney, Agent, or Firm* — Ralph E. Smith

(57) ABSTRACT

Techniques for real-time virtual sensing of an axle assembly temperature include determining, at a controller of a vehicle, an initial temperature of an axle assembly of the vehicle based on an ambient temperature and a fluid temperature of a transmission. The techniques include determining, at the controller, an operating mode of the vehicle, the operating mode of the vehicle being one of moving and non-moving. The techniques also include estimating, at the controller, a temperature of the axle assembly based on the initial axle assembly temperature and the vehicle operating mode using an axle temperature model.

20 Claims, 5 Drawing Sheets

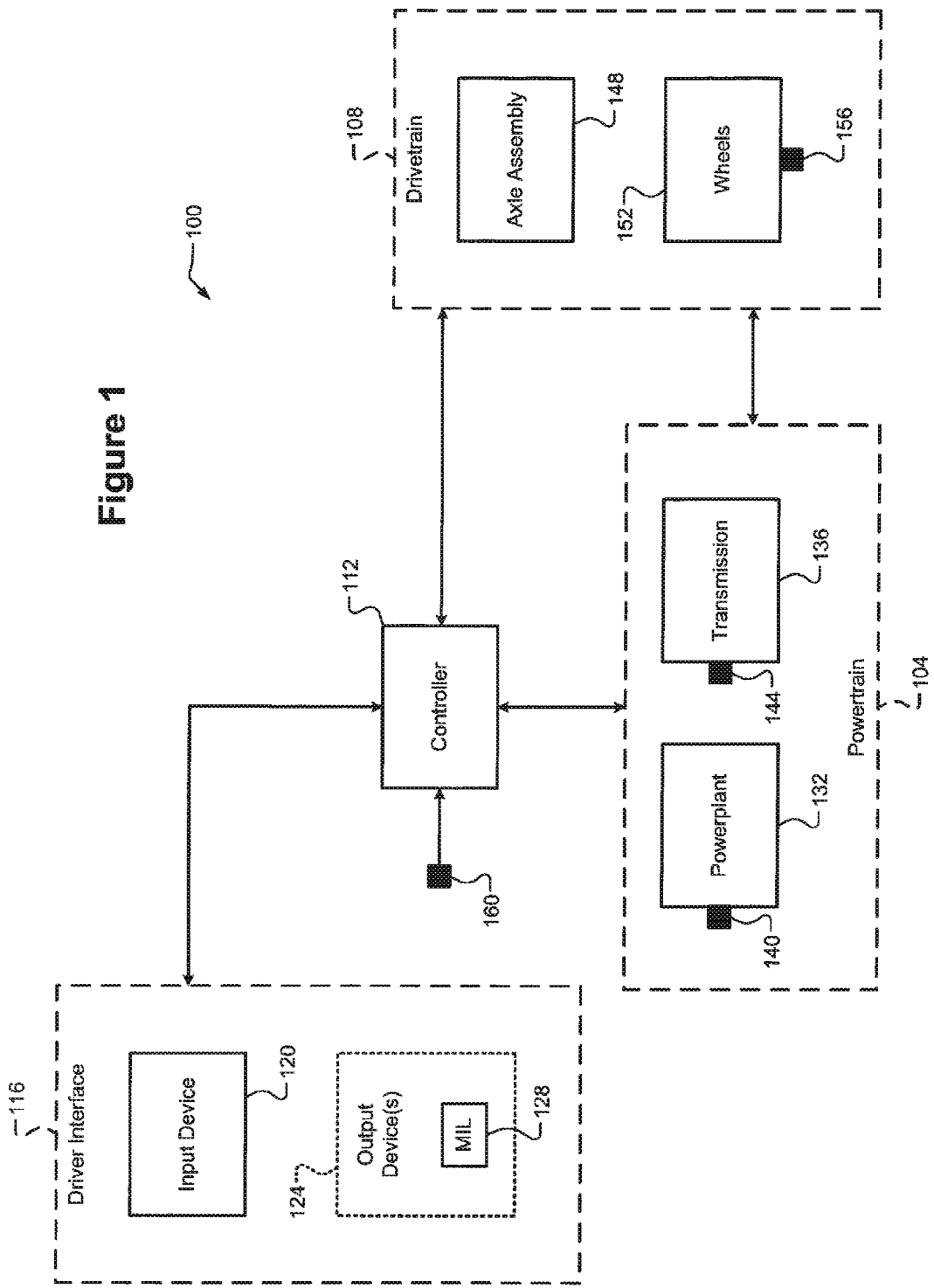

REAL-TIME VIRTUAL AXLE ASSEMBLY TEMPERATURE SENSOR

FIELD

The present disclosure relates generally to virtual sensors for vehicles and, more particularly, to a real-time virtual axle assembly temperature sensor.

BACKGROUND

A typical vehicle includes a powertrain that generates drive torque and transfers the drive torque to a drivetrain. Example components of the powertrain include an engine and a transmission. Example components of the drivetrain include wheels, drive/axle shafts, a differential, and gears (a pinion gear, a ring or hypoid gear, a differential gear set, etc.). Depending on the type of vehicle (rear wheel drive, front wheel drive, all-wheel drive, etc.), the drivetrain also includes at least one axle assembly, which is referred to as a drive or powered axle assembly. During high load situations, such as towing and/or driving up a steep grade, drivetrain friction increases the temperature of each drive axle assembly.

Each drive axle assembly is typically lubricated, e.g., with oil, to decrease friction losses at the drive axle assembly. The viscosity of the lubricant, however, is affected by temperature. Because the axle assembly temperature is often unknown, an axle overheat condition could go undetected during such high load situations, which could potentially cause damage to the axle assembly and thereby increase warranty costs. Thus, while conventional drivetrains work for their intended purpose, there remains a need for improvement in the relevant art.

SUMMARY

In one aspect, a vehicle is provided in accordance with the teachings of the present disclosure. In an exemplary implementation, the vehicle includes an axle assembly having an input, a pair of axle shafts, a gearbox, and an axle housing. The input is configured to receive drive torque from a powertrain of the vehicle and the gearbox is configured to translate the drive torque from the input to the pair of axle shafts. The axle shaft housing includes a gearbox housing portion that houses the gearbox and an axle shaft housing portion that houses at least a portion of the pair of axle shafts. The vehicle also includes a controller configured to: (i) determine an initial temperature of the axle assembly based on an ambient temperature and a fluid temperature of a transmission of the vehicle, (ii) determine an operating mode of the vehicle, the operating mode of the vehicle being one of moving and non-moving, and (iii) estimate a temperature of the axle assembly based on the initial axle assembly temperature and the vehicle operating mode using an axle temperature model.

In another aspect, a method is provided in accordance with the teachings of the present disclosure. In an exemplary implementation, the method includes determining, at a controller of a vehicle, an initial temperature of an axle assembly of the vehicle based on an ambient temperature and a fluid temperature of a transmission. The method includes determining, at the controller, an operating mode of the vehicle, the operating mode of the vehicle being one of moving and nonmoving. The method also includes estimating, at the controller, a temperature of the axle assembly based on the initial axle assembly temperature and the vehicle operating mode using an axle temperature model.

In some implementations, axle temperature model is a lumped system model based on a difference between (i) heat generated by the gearbox and (ii) heat lost to an environment via the gearbox housing and the axle shaft housing. In some implementations, the heat lost to the environment via the gearbox housing and the axle shaft housing is determined based on a natural convection heat transfer model when the vehicle is non-moving. In other implementations, the heat lost to the environment via the gearbox housing and the axle shaft housing is determined based on a forced convection heat transfer model when the vehicle is moving.

In some implementations, the controller is configured to estimate the temperature of the axle assembly based on (i) a rotational speed of a powertrain of the vehicle, (ii) a speed of the vehicle, (iii) a rotational speed of the axle shafts, and (iv) a drive torque at the axle shafts. In some implementations, the controller is configured to determine the initial temperature of the axle assembly based on a time since a key-off event of the vehicle.

In some implementations, the controller is further configured to perform torque management of the powertrain based on the estimated axle assembly temperature. In some implementations, the controller is further configured to perform speed limiting of the vehicle based on the estimated axle assembly temperature. In some implementations, based on the estimated axle assembly temperature, the controller is further configured to: set a diagnostic trouble code (DTC), enable a malfunction indicator lamp (MIL), and/or output an axle assembly lubricant change indicator.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 1 is an example functional block diagram of a vehicle according to the principles of the present disclosure;

DESCRIPTION

Figure 2A:
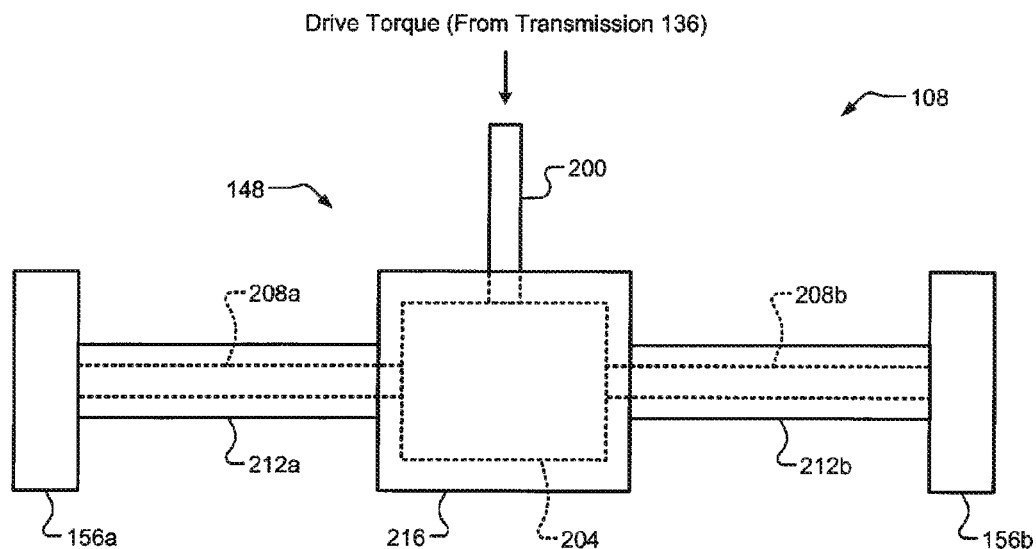
FIG. 2A is an example partial schematic diagram of a drivetrain having an axle assembly according to the principles of the present disclosure.

As mentioned above, there remains a need for improvement to conventional drivetrains. If the real-time temperature of drive axle assemblies was known, a torque management and/or vehicle speed limiting strategy could be implemented to prevent the axle assembly temperatures from exceeding a threshold. One or more physical temperature sensors could be implemented to measure axle assembly temperatures, but this would increase costs. Accordingly, systems and methods for real-time virtual axle assembly temperature sensors are presented. In one exemplary implementation, the systems and methods utilize a lumped system model for axle assembly temperature to estimate a temperature of a drive axle assembly based on various operating parameters.

In one exemplary implementation, a controller determines an initial temperature of an axle assembly of a vehicle based on ambient temperature and transmission fluid temperature. The controller also determines an operating mode of the vehicle. Examples of the operating mode include non-moving (park, idle, etc.) and moving. The controller estimates a temperature of the axle assembly based on the initial temperature and the operating mode using an axle temperature model. In one exemplary implementation, the axle temperature model involves modeling heat transfer of the axle assembly as a lumped system in which heat is generated by a gearbox of the axle assembly and heat is dissipated via a gearbox housing and axle shaft housing(s) of the axle assembly. The operating mode of the vehicle specifies whether the axle temperature model uses natural convection (non-moving) or forced convection (moving) in determining the heat dissipation.

The controller stores the estimated axle temperature, e.g., at a memory. The controller is then able to monitor changes in the estimated axle temperature over a period of time. For example only, the controller could determine an average estimated axle temperature. Based on the estimated axle temperature (or average estimated axle temperature), the controller is able to perform various functions. In one exemplary implementation, the controller performs torque management based on the estimated axle temperature. In another exemplary implementation, the controller performs vehicle speed limiting based on the estimated axle temperature. In yet another exemplary implementation, the controller generates at least one output. Examples of the output(s) include setting a diagnostic trouble code (DTC), enabling a malfunction indicator lamp (MIL), and outputting an axle assembly lubricant change indicator.

In another exemplary implementation, a method is presented for determining a specific axle size for a specific vehicle application. In one exemplary implementation, this method also includes determining a specific lubricant type for the specific vehicle application. By utilizing a minimum acceptable axle size and/or lubricant type, vehicle costs could be decreased. Example parameters specified by the specific vehicle application include size, weight, horsepower, materials, and the like. For example, a smaller axle could be utilized for a specific vehicle application when the axle temperature model indicates that its current axle never exceeds a specific temperature threshold. Examples of the specific lubricant type include the type of lubricant and/or additives to the lubricant. For example, no additives could be utilized for a specific vehicle application when the axle temperature model indicates that its current axle (and thus its current lubricant) never exceeds the specific temperature threshold.

Referring now to FIG. 1, an example functional block diagram of a vehicle 100 is illustrated. In one exemplary implementation, the vehicle 100 is a pickup truck. The vehicle 100 includes a powertrain 104 that generates and transfers drive torque to a drivetrain 108. A controller 112 controls operation of the powertrain 104 to generate a desired drive torque based on a torque request from a driver via an input device 120, e.g., an accelerator pedal, of a user interface 116. The user interface 116 also includes one or more output device(s), such as a MIL 124. Other example output devices include gauges and a display (an in-dash display, a center console display, etc.).

In one exemplary implementation, the powertrain 104 includes a powerplant 132 and a transmission 136. Example components of the powerplant 132 include an engine (spark ignition, diesel, homogeneous charge compression ignition (HCCI), etc.), an electric motor, a battery system, or a combination thereof. A powerplant speed sensor 140 measures a rotational speed of the powerplant 132. For example only, the powerplant speed sensor 140 could measure a rotational speed of a crankshaft of an engine or a rotational speed of an electric motor. A transmission fluid temperature sensor 144 measures a temperature of a fluid (hydraulic fluid, oil, etc.) of the transmission 136.

In one exemplary implementation, the drivetrain 108 includes at least one drive axle assembly 148 (hereinafter "axle assembly 148") and wheels 152. For example, the wheels 152 could comprise four wheels, but it will be appreciated that other numbers of wheels 152 could be implemented. Specifically, the axle assembly 148 receives the drive torque from the transmission 136 and translates the drive torque to the wheels 152. A wheel speed sensor 156, e.g., an anti-lock braking system (ABS) sensor, measures a rotational speed of the wheels 152, which is indicative of a speed of the vehicle 100. It will be appreciated, however, that another suitable vehicle speed sensor could be implemented, such as a transmission output shaft speed (TOSS) sensor.

Referring now to FIG. 2A, an example partial schematic diagram of the drivetrain 108 is illustrated. The axle assembly 148 includes an input 200 that receives drive torque from the transmission 136. The input 200 provides the drive torque to a gearbox 204 of axle assembly 148 that translates the drive torque from the transmission 136 to axle shafts 208a and 208b (collectively "axle shafts 208" and also known as "drive shafts" or "half shafts"). The axle assembly 148 includes axle shafts 208a and 208b that are coupled to wheels 156a and 156b, respectively (collectively "wheels 156"). Axle shaft housings 212a and 212b (collectively "axle housing 212") house the axle shafts 208. Similarly, an axle gearbox housing 216 houses the gearbox 204. While separate axle shaft and gearbox housings 212 and 216 are shown and discussed herein for purposes of more clearly explaining thermodynamic heat transfer, it will be appreciated that the axle assembly 148 could have a single or unitary housing that houses the gearbox 204 and axle shafts 208. In this exemplary implementation, the unitary axle housing includes a gearbox housing portion and an axle tube housing portion.

Figure 2B:
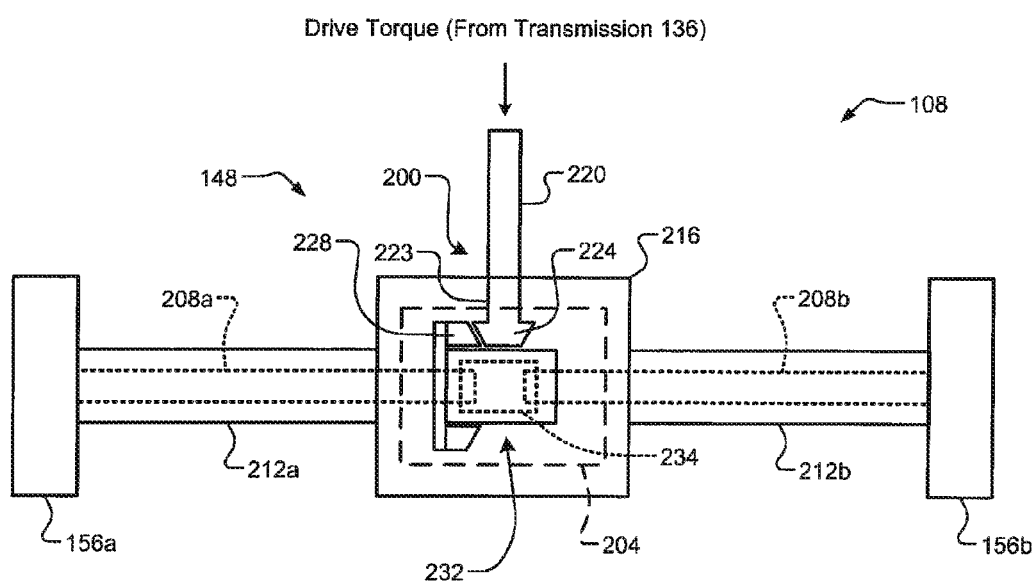
FIG. 2B is an example partial schematic diagram of the drivetrain having the axle assembly including a gearbox having a pinion/ring gear and differential configuration according to the principles of the present disclosure.

Referring now to FIG. 2B, an example schematic diagram of the drivetrain 108 is illustrated and will now be discussed in greater detail. While the drivetrain 108 is shown to be an exemplary rear-wheel drive configuration, it will be appreciated that the drivetrain 108 could be modified for front-wheel drive and all-wheel or four-wheel drive configurations. As can be seen in FIG. 2B, a propeller (prop) shaft 220 is coupled directly or indirectly to the transmission 136 so as to receive drive torque from transmission 136. The prop shaft 220 is coupled to a pinion shaft 223 having a pinion gear 224 that is meshingly engaged with and drives a ring gear 228 fixed to a differential case of a differential assembly 232. The differential assembly 232 houses a differential gear set 234 in the differential case, as is known in the art. The differential gear set 234, in one exemplary implementation, includes a pair of bevel gears meshingly engaged with a pair of side gears, which are coupled to the respective axle shafts 208a, 208b. In this exemplary implementation, the ring gear 228 and pinion gear 224 form a hypoid gear set. Hypoid gear sets are typically less efficient than other gear sets, such as parallel axis gears, due to the sliding velocities induced by the hypoid gear geometry, as is also known in the art.

The prop shaft 220, pinion shaft and gear 224, and differential assembly 232 thereby translate the drive torque from the transmission 136 to the axle shafts 208, while the differential gear set 234 of differential assembly 232 also facilitates relative rotation of the axle shafts 208, e.g., during vehicle turns. For purposes of this disclosure, the term "gearbox" (e.g., gear box 204) refers to a differential assembly (e.g., assembly 232) having a differential gear set and a ring gear (e.g., 228) that receives input from a pinion shaft gear (e.g., 224). It will be appreciated, however, that the gearbox 204 could have another other configurations.

Figure 3A:
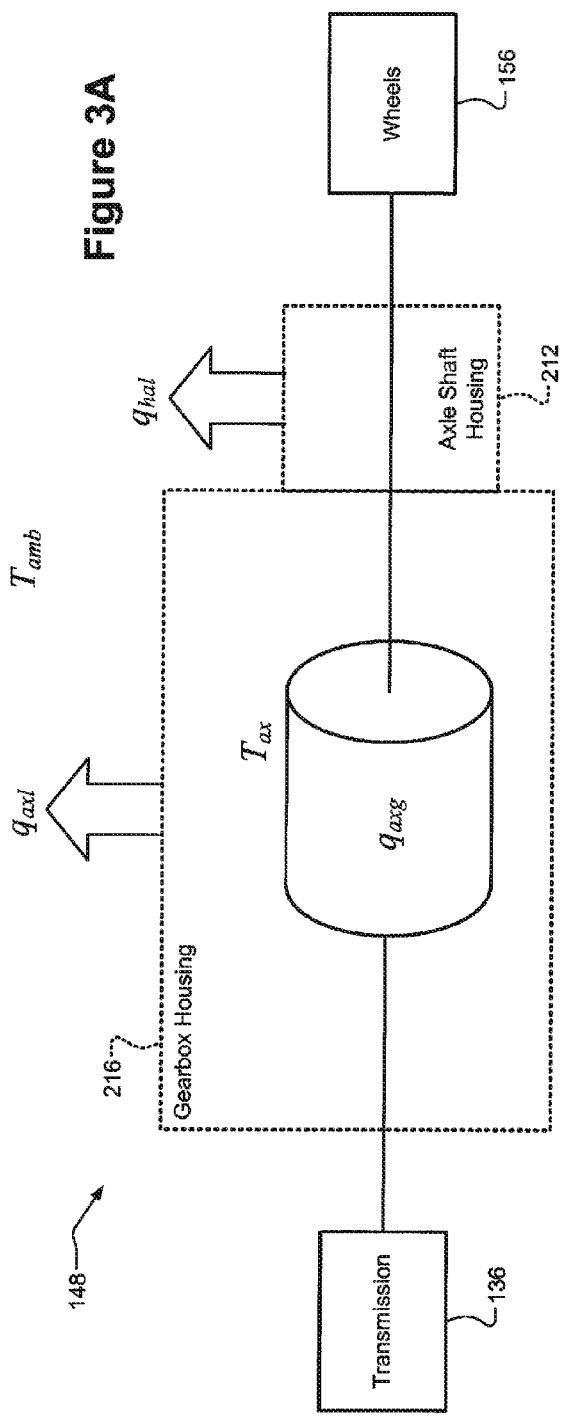
FIG. 3A is an example schematic diagram of a lumped system model for axle assembly temperature according to the principles of the present disclosure.

Referring now to FIG. 3A, a schematic diagram of a lumped system model for a temperature of the axle assembly 148 (hereinafter "axle temperature model") is illustrated. Due to the lubrication flow inside the axle assembly 148, the axle assembly temperature is relatively uniform, which supports treating it as a lumped system. In the axle temperature model, $q_{axg}$ represents the heat generation by the gearbox 204. In one exemplary implementation, $q_{axg}$ could be the heat generation by rolling and sliding frictional losses between gear teeth of the pinion gear 224, the ring gear 228, and the differential gear set 234, windage losses due to complex interactions with the air surrounding these gears, and oil splashing and churning losses inside the gearbox 204, as well as the losses associated with bearings and seals. For example, frictional losses of hypoid gears (e.g., 86-97% efficiency) are often much larger than frictional losses of parallel axis gears (e.g., 99+% efficiency).

Also in the axle temperature model, $q_{axl}$ and $g_{hal}$ represent heat losses of the gearbox housing 216 and the axle shaft housing 212 to an environment, respectively, and $T_{ax}$ and $T_{amb}$ represent temperatures of the axle assembly 148 and the environment (ambient temperature), respectively. In this lumped system model, the rate of change of energy storage is mainly equal to the summation of the heat generated from the axle assembly 148 (e.g., by the gearbox 204) and the heat transfer to the environment. In one exemplary implementation, the heat transfer for the lumped system is modeled as follows:

$$E = q_{axg} - q_{axl} - g_{hal} \quad (1),$$

where E represents the resulting energy (heat) of the system. In one exemplary implementation, E is equal to:

$$E = \int_0^t \rho V C \frac{dT}{dt} dt, \quad (2)$$

where t represents time, T represents a temperature of the system, p represents a density of the lumped system, V represents a volume of the system, and C represents a heat capacity of the system.

With regard to the heat transfer between the system and the ambient environment, two operating conditions of the vehicle (e.g., moving and non-moving) are considered based on differences in the heat transfer between the two conditions. For example, when the vehicle 100 is not moving (park, stopped and idling, etc.), there is natural convection between the axle assembly 148 and the ambient environment. In contrast, when the vehicle 100 is moving, there is forced convection between the axle assembly 148 and the ambient environment. Therefore, two operating modes are defined for vehicle 100 in the axle temperature model: (1) non-moving, and (2) moving.

In one exemplary implementation, the heat transfer (dissipation) $q_{axl}$ from the gearbox housing 216 to the ambient environment is defined as:

$$q_{axl} = A_{ax} h (T_{ax} - T_{amb}) \quad (3),$$

where $A_{ax}$ represents an area of the gearbox housing 216 exposed to the ambient environment and h represents a heat transfer coefficient between the gearbox housing 216 and the ambient environment. In order to obtain the heat transfer coefficient, it is necessary to determine the empirical formulas for Nusselt numbers. In one exemplary implementation, the Nusselt numbers for the gearbox housing 216 during natural convection and forced convection are:

$$Nu_{nat} = 2 + 0.43 (GrPr)^{1/4}, 1 < Gr < 100,000 \quad (4), \text{ and}$$

$$Nu_{for} = 0.37 Re^{0.6}, 17 < Re < 70,000 \quad (5),$$

where Gr represents the Grashof number, Pr represents the Prantle number, and Re represents the Reynolds number.

Figure 3B:
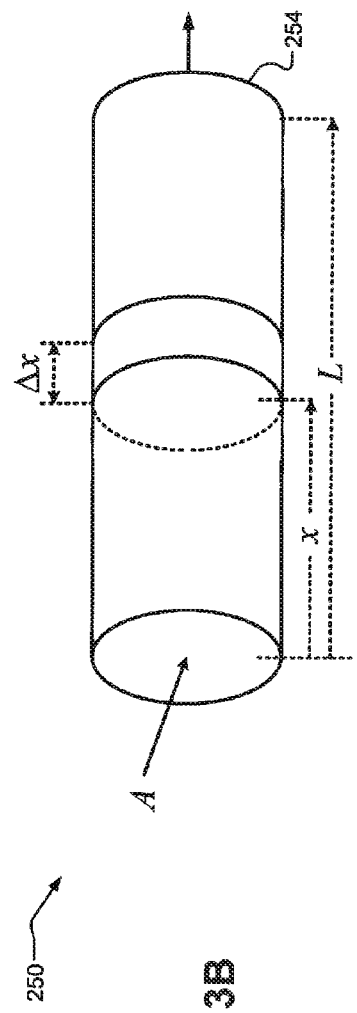
FIG. 3B is an example schematic diagram a rod heat transfer model according to the principles of the present disclosure.

For the heat transfer (dissipation) $q_{hal}$ from the axle shaft housing 212 to the ambient environment, a different approach is utilized because the surface temperature of the axle shaft housing 212 is not uniform. Therefore, in one exemplary implementation, this is treated as a one-sided connected rod problem as shown in FIG. 3B, which illustrates an example schematic diagram of a rod heat transfer model 250. In one exemplary implementation, energy balance is applied to a finite section $\Delta x$ of the rod 254 as follows:

$$q_x - q_{x+\Delta x} = q_c \quad (6), \text{ where}$$

$$q_x = -kA \frac{dT_{hs}}{dx}\bigg|_x, \quad (7)$$

$$q_{x+\Delta x} = -kA \frac{dT_{hs}}{dx}\bigg|_{x+\Delta x}, \text{ and} \quad (8)$$

$$q_c = hp(\Delta x)(T_{hs} - T_{amb}). \quad (9)$$

where k, h, and p represent scalars and $T_{hs}$ represents the temperature of the axle shaft housing 212. By substituting Equations (7)-(9) into Equation (6), the solution of the resulting second-order differential equation is:

$$\Delta T = C_1 e^{mx} + C_2 e^{-mx} \quad (10), \text{ while assuming}$$

$$\Delta T = T_{hs} - T_{amb} \text{ and } m^2 = \frac{hp}{kA},$$

where $C_1$ and $C_2$ are unknown coefficients.

In one exemplary implementation, the following boundary conditions for the axle shafts 208 are specified to find the coefficients $C_1$ and $C_2$:

(1) At x=0, the temperature of the gearbox housing 216 is almost equal to axle shaft housing 212:

$$T_{hs}=T_{ax};$$

(2) The temperature difference in a finite section is almost zero at an end:

$$\frac{d\Delta T}{dx}\bigg|_{x=L} = 0;$$

(3) Use the values of $C_1$ and $C_2$ in the $\Delta T$ equation:

$$T_{hs} - T_{amb} = (T_{ax} - T_{amb})\left(\frac{e^{-mL} \cdot e^{mx}}{e^{-mL} + e^{mL}} + \frac{e^{mL} \cdot e^{-mx}}{e^{-mL} + e^{mL}}\right); \quad (11)$$

(4) Use the value of $T_{hs}-T_{am}$ in the convection heat loss equation of for the axle shaft $q_c$ and the total heat transfer between the rod and the ambient environment is:

$$q_{hal} = \int_0^L q_c dx = \int_0^L hp(T_{ax} - T_{am})\left(\frac{e^{-mL} \cdot e^{mx}}{e^{-mL} + e^{mL}} + \frac{e^{mL} \cdot e^{-mx}}{e^{-mL} + e^{mL}}\right) dx; \quad (12)$$

and (5) Solving the above equation gives the heat loss from the axle shaft housing 212:

$$q_{hal} = \sqrt{hpkA}\,(T_{ax} - T_{aa})\tanh\sqrt{\frac{hp}{kA}}\,L, \quad (13)$$

where $$\tanh x = \frac{\sinh x}{\cosh x},\ \cosh x = \frac{e^x + e^{-x}}{2},\ \sinh x = \frac{e^x - e^{-x}}{2},\text{ and}$$

$$P = 2\pi r_0.$$

When the axle shafts are not solid rods:

$$A=\pi(r_o^2 - r_i^2) \quad (14).$$

Also, the above solution for $g_{hal}$ only represents one of the axle shaft housings 212 (i.e., 212a or 212b), so the total heat transfer between both of the axle shaft housings 212 is:

$$q_{hal} = f(T_{ax}, T_{aa}, N_0, t_s)\sqrt{hpkA}\,(T_{ax} - T_{aa})\tanh\sqrt{\frac{hp}{kA}}\,L, \quad (15)$$

where $f(T_{ax},T_{aa},N_o,t_s)$ represents a correction factor, which includes possible assumptions that could cause errors. For the axle shaft housing 212, in one exemplary implementation, the Nusselt number in natural convection is:

$$Nu_{nat} = \left\{0.60 + 0.387\left(\frac{GrPr}{\left[1+\left(\frac{0.559}{Pr}\right)^{\frac{9}{16}}\right]^{\frac{16}{9}}}\right)^{\frac{1}{6}}\right\}^{\frac{1}{2}}. \quad (16)$$

Also for the axle shaft housing 212, in one exemplary implementation, the Nusselt number in forced convection is:

$$Nu_{for}=(0.43+0.50Re^{0.5})Pr^{0.38}\ 1<Re_a<10^3 \quad (17),$$

which is rewritten as:

$$Nu_{for} = (0.25Re^{0.6})Pr^{0.38} \quad (18),$$

$10^3 < Re_a < 2\times10^5$ where $$Re_a = \frac{VD}{\nu},\ Pr = \frac{\mu c_p}{k},\text{ and } G_r = \frac{g\beta(\Delta T)D^3\rho^2}{\mu^2}.$$

In the above equations, $\beta=1/T$ (where ambient temperature $T_{amb}$ is in absolute temperature), V is the vehicle speed, D is the diameter of the axle shaft housing 212, $\nu$ is the air kinematical viscosity, $\mu$ is the air absolute viscosity, which equals $\nu\rho$, K is the air thermal conductivity, $c_p$ is the air specific heat, g is the gravity, and $\Delta T$ is temperature difference between the axle shaft housing 212 and the ambient environment.

Thus, the temperature of the axle assembly 148 is represented as follows:

$$T_{ax} = T_{ax}^{i-1} + \frac{q_{axg} - q_{axl} - q_{hal}}{m_{th}}\Delta t, \quad (19)$$

where $\Delta t$ is the loop time and $m_{th}$ is a thermal mass of the axle assembly 148, which is represented is follows:

$$m_{th}=\Sigma V_i\rho_i C_{pi} \quad (20),$$

where $V_i$, $\rho_i$, and $c_{pi}$ are the weight and specific heat of the individual gears (pinion, ring/hypoid, differential gear set, etc.), a differential carrier, the housings, and the lubricant, respectively.

In order to predict/estimate the axle assembly temperature accurately, the initial axle assembly temperature condition has to be defined properly. At powerplant start, if the transmission fluid temperature is equal to the ambient temperature, the initial axle assembly temperature is equal to the ambient temperature. However, if the transmission fluid temperature is not equal to ambient temperature, the initial axle assembly temperature will be defined separately. More specifically, when the vehicle is non-moving (park, stop idle, etc.), heat generated in the gearbox housing 216 is zero ($q_{axg}=0$) and heat loss/dissipation from the axle shaft housing 212 is negligible ($q_{hal}=0$). Thus, inserting these into the energy balance equation results in the following first order differential equation:

$$\ln(T_{ax} - T_{amb}) + c = -\frac{A_{ax}h}{\rho Vc}. \quad (21)$$

The above equation (21) is solved by putting the following boundary condition: at a key-off event (t=0), the axle assembly temperature is the same as a key-off axle assembly temperature $T_{ko}$ ($T_{ax}=T_{ko}$). By finding the value of c and inserting it into the above equation (21), the axle assembly temperature at the key-off event will be:

$$T_{ax}=T_{amb}+(T_{ko}-T_{amb})e^{-st} \quad (22),$$

where t represents the time since key-off (e.g., the time interval between key-off and next key-on) and $s=hA_{ax}/(\rho_i V_i c_{pi})$. In one exemplary implementation, if the transmission fluid temperature is less than ambient temperature at powerplant starts, the initial axle assembly temperature will be equal to the transmission fluid temperature. In another exemplary implementation, if the transmission fluid temperature is within a predetermined threshold of the ambient temperature, the initial axle assembly temperature will be equal to the ambient temperature. Further, in one exemplary implementation, the loop time Δt is one second and the powerplant start thresholds are greater than 100 revolutions per minute (RPM) and two seconds of powerplant runtime.

Figure 4:
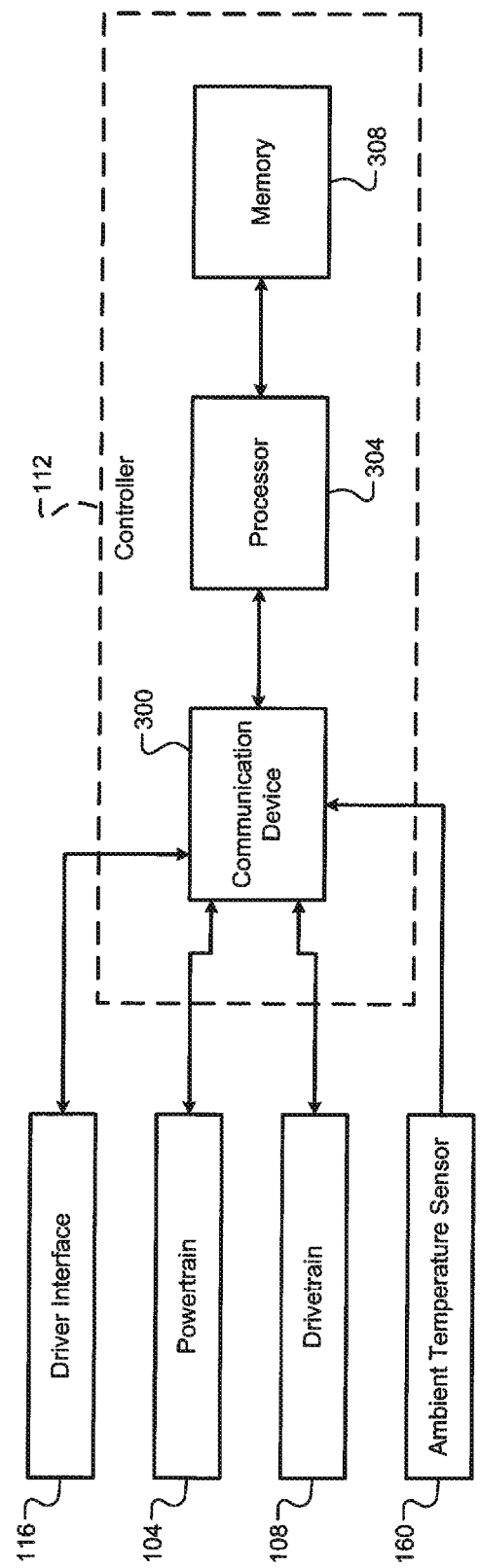
FIG. 4 is an example functional block diagram of a controller according to the principles of the present disclosure.

Referring now to FIG. 4, an example functional block diagram of the controller 112 is illustrated. The controller 112 includes a communication device 300, a processor 304, and a memory 308. The communication device 300 includes any suitable components (e.g., a transceiver) configured for communication with other components of the vehicle 100 via a controller area network. The processor 304 controls operation of the controller 112 and is configured to implement at least a portion of the real-time virtual temperature sensor as discussed herein. It will be appreciated that the term "processor" as used herein refers to both a single processor and two or more processors operating in a parallel or distributed architecture. The memory 308 is any suitable storage medium (flash, hard disk, etc.) configured to store information at the controller 112.

Figure 5:
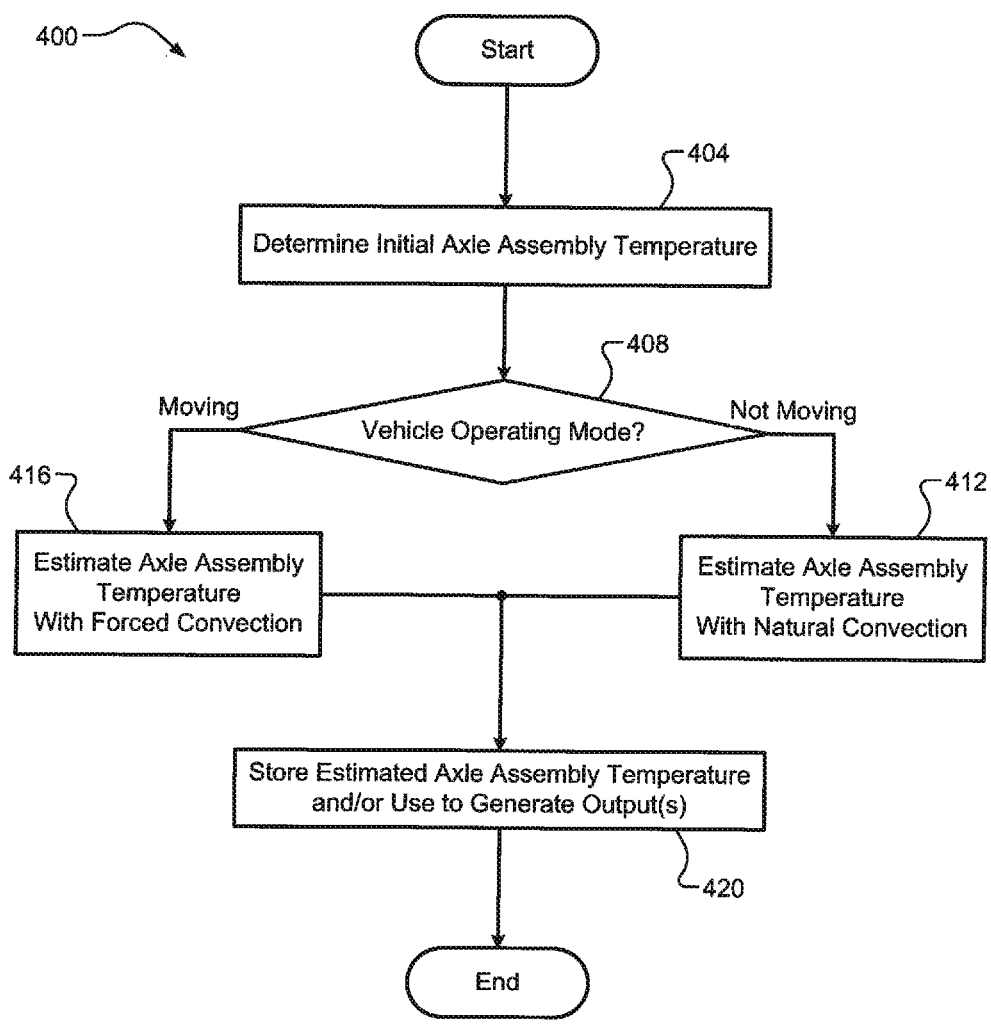
FIG. 5 is an example flow diagram of a method for real-time virtual sensing of an axle assembly temperature according to the principles of the present disclosure.

Referring now to FIG. 5, an example flow diagram of a method for a real-time virtual axle temperature sensor is illustrated. At 404, the controller 112 determines an initial temperature of the axle assembly 148 based on (i) an ambient temperature and (ii) a fluid temperature of the transmission 136. At 408, the controller 112 determines an operating mode of the vehicle 100. If the vehicle 100 is not moving, the method proceeds to 412. If the vehicle 100 is moving, the method proceeds to 416. At 412, the controller 112 estimates a temperature of the axle assembly 148 based on the initial temperature of the axle assembly 148 and an axle temperature model.

Specifically, the axle temperature model uses the initial temperature of the axle assembly 148 and models the temperature of the axle assembly 148 as a difference between (i) heat generated by the gearbox 208 and (ii) heat lost to the environment via the gearbox housing 216 and the axle shaft housing 212 through natural convection. The method 400 then proceeds to 420. At 416, the controller 112 estimates the temperature of the axle assembly 148 based on the initial temperature of the axle assembly 148 and the axle temperature model.

Specifically, the axle temperature model uses the initial temperature of the axle assembly 148 and models the temperature of the axle assembly 148 as a difference between (i) heat generated by the gearbox 208 and (ii) heat lost to the environment via the gearbox housing 216 and the axle shaft housing 212 through forced convection. The method 400 then proceeds to 420. At 420, the controller 112 stores the estimated temperature of the axle assembly 148 at the memory 308 and/or generates at least one output based on the estimated temperature of the axle assembly 148. Examples of the output include performing torque management and/or vehicle speed limiting based on the estimated temperature of the axle assembly 148.

Other examples of the output include setting a DTC, enabling the MIL 128, and outputting an axle assembly lubricant change indicator, such as via the output device(s) 124, when the estimated temperature of the axle assembly 148 exceeds respective axle assembly temperature thresholds. For example, the estimated temperature of the axle assembly 148 could be stored at the memory 308 over a period of time and then the at least one output could be generated based on the stored estimated axle assembly temperatures, such as an average estimated axle assembly temperature. The method 400 then ends or returns to 404 for one or more additional cycles.

It should be understood that the mixing and matching of features, elements, methodologies and/or functions between various examples could be expressly contemplated herein so that one skilled in the art would appreciate from the present teachings that features, elements and/or functions of one example could be incorporated into another example as appropriate, unless described otherwise above.

What is claimed is:

1. A vehicle, comprising:
    an axle assembly, including:
        an input configured to receive drive torque from a powertrain of the vehicle,
        a pair of axle shafts,
        a gearbox that translates the drive torque from the input to the pair of axle shafts, and
        an axle housing having an axle shaft portion that houses at least a portion of the pair of axle shafts and a gearbox housing portion that houses the gearbox; and
    a controller configured to:
        (i) determine an initial temperature of the axle assembly based on an ambient temperature external to the vehicle and a fluid temperature of a transmission of the vehicle,
        (ii) determine an operating mode of the vehicle, the operating mode of the vehicle being one of moving and non-moving, and
        (iii) estimate, using an axle temperature model, a temperature of the axle assembly based on the determined initial axle assembly temperature and the vehicle operating mode.

2. The vehicle of claim 1, wherein:
    the input includes a pinion shaft having a pinion gear fixed thereto; and
    the gearbox includes the pinion gear and a differential assembly, the differential assembly having a ring gear in meshing engagement with the pinion gear and a differential gear set coupled to the pair of axle shafts.

3. The vehicle of claim 1, wherein the controller is configured to estimate the temperature of the axle assembly based on (i) a rotational speed of the powertrain, (ii) a speed of the vehicle, (iii) a rotational speed of the axle shafts, and (iv) a drive torque at the axle shafts.

4. The vehicle of claim 1, wherein the controller is configured to determine the initial temperature of the axle assembly based on a time since a key-off event of the vehicle.

5. The vehicle of claim 1, wherein the controller is further configured to perform torque management of the powertrain based on the estimated axle assembly temperature.

6. The vehicle of claim 1, wherein the controller is further configured to perform speed limiting of the vehicle based on the estimated axle assembly temperature.

7. The vehicle of claim 1, wherein, based on the estimated axle assembly temperature, the controller is further configured to at least one of:
set a diagnostic trouble code (DTC);
enable a malfunction indicator lamp (MIL); and
output an axle assembly lubricant change indicator.

8. The vehicle of claim 1, wherein the axle temperature model comprises a lumped system model based on a difference between (i) heat generated by the gearbox, and (ii) heat lost to an environment via the gearbox housing portion and the axle shaft housing portion.

9. The vehicle of claim 8, wherein the heat lost to the environment via the gearbox housing portion and the axle shaft housing portion is determined based on a natural convection heat transfer model when the vehicle is non-moving.

10. The vehicle of claim 8, wherein the heat lost to the environment via the gearbox housing portion and the axle shaft housing portion is determined based on a forced convection heat transfer model when the vehicle is moving.

11. A method for estimating an axle assembly temperature, comprising:
determining, at a controller of a vehicle, an initial temperature of an axle assembly of the vehicle based on an ambient temperature external to the vehicle and a fluid temperature of a transmission of the vehicle;
determining, at the controller, an operating mode of the vehicle, the operating mode being one of moving and non-moving; and
estimating, at the controller, a temperature of the axle assembly based on the initial axle assembly temperature and the vehicle operating mode using an axle temperature model.

12. The method of claim 11, wherein determining, at the controller, the initial temperature of the axle assembly is further based on a time since a key-off event of the vehicle.

13. The method of claim 11, further comprising performing, by the controller, torque management of a powerplant of the vehicle, the transmission, or a combination thereof based on the estimated axle assembly temperature.

14. The method of claim 11, further comprising performing, by the controller, speed limiting of the vehicle based on the estimated axle assembly temperature.

15. The method of claim 11, wherein estimating, at the controller, the temperature of the axle assembly based on the initial axle assembly temperature and the vehicle operating mode using the axle temperature model includes estimating, at the controller, a temperature of the axle assembly based on the initial axle assembly temperature and the vehicle operating mode using the axle temperature model in an absence of an axle temperature sensor associated with the axle assembly.

16. The method of claim 11, wherein:
the axle temperature model comprises a lumped system model based on a difference between (i) heat generated by a gearbox of the axle assembly and (ii) heat lost to an environment via a gearbox housing portion of the axle assembly and an axle shaft housing portion of the axle assembly; and
the axle shaft housing portion houses a pair of axle shafts of the axle assembly, and the gearbox housing portion houses a gearbox that is configured to translate drive torque from an input of the axle assembly to the pair of axle shafts.

17. The method of claim 16, wherein the heat lost to the environment via the gearbox housing portion and the axle shaft housing portion is determined based on a natural convection heat transfer model when the vehicle is non-moving.

18. The method of claim 16, wherein the heat lost to the environment via the gearbox housing portion and the axle shaft housing portion is determined based on a forced convection heat transfer model when the vehicle is moving.

19. The method of claim 16, wherein estimating, at the controller, the axle assembly temperature is further based on (i) a rotational speed of a powertrain of the vehicle, (ii) a speed of the vehicle, (iii) a rotational speed of the axle shafts, and (iv) a drive torque at the axle shafts.

20. A system for a vehicle, the system comprising:
a transmission fluid temperature sensor configured to measure a temperature of a fluid in a transmission of the vehicle; and
a controller configured to:
determine an initial temperature of an axle assembly of the vehicle based on an ambient temperature external to the vehicle and the measured transmission fluid temperature;
determine an operating mode of the vehicle, the operating mode being one of moving and non-moving; and
estimate a temperature of the axle assembly based on the initial axle assembly temperature and the vehicle operating mode using an axle temperature model.

* * * * *